(12) United States Patent
Zhang

(10) Patent No.: US 9,377,819 B2
(45) Date of Patent: Jun. 28, 2016

(54) ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Ming-Liang Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/479,072

(22) Filed: Sep. 5, 2014

(65) Prior Publication Data

US 2015/0185785 A1     Jul. 2, 2015

(30) Foreign Application Priority Data

Dec. 26, 2013  (CN) .......................... 2013 1 0729986

(51) Int. Cl.
*H05K 7/16* (2006.01)
*G06F 1/16* (2006.01)

(52) U.S. Cl.
CPC ............ *G06F 1/1658* (2013.01); *G06F 1/1616* (2013.01)

(58) Field of Classification Search
CPC ..... G06F 1/1658; G06F 1/1616; G06F 1/181; G06F 1/184; G06F 1/187; G11B 33/02; G11B 33/124; G11B 33/056; G11B 33/08; G11B 33/128; G11B 25/043

USPC ............... 361/679.31–679.4, 679.43, 679.58, 361/679.59, 683, 684, 685, 686, 724–727; 312/119, 216, 223.1, 223.2; 439/297, 439/298

See application file for complete search history.

(56) References Cited

U.S. PATENT DOCUMENTS

| | | | | |
|---|---|---|---|---|
| 6,272,091 | B1* | 8/2001 | Ikari ................... | G06K 13/0806 720/720 |
| 7,679,899 | B2* | 3/2010 | Hsieh .................... | G06F 1/1616 361/679.38 |
| 9,004,621 | B2* | 4/2015 | Honda ................. | H05K 5/0221 312/223.2 |
| 2002/0071254 | A1* | 6/2002 | Tien ........................ | G05F 1/1616 361/727 |
| 2004/0032709 | A1* | 2/2004 | Liu ....................... | G06K 7/0021 361/679.32 |
| 2010/0208423 | A1* | 8/2010 | Lai ........................ | G11B 33/124 361/679.38 |
| 2011/0101835 | A1* | 5/2011 | Wu ......................... | G06F 1/181 312/223.2 |
| 2012/0127658 | A1* | 5/2012 | Hartman ................ | G06F 1/186 361/679.59 |
| 2012/0162925 | A1* | 6/2012 | Luo ..................... | G06K 13/0831 361/727 |
| 2013/0033845 | A1* | 2/2013 | Duan ................... | G06K 13/085 361/807 |

\* cited by examiner

*Primary Examiner* — Hoa C Nguyen
*Assistant Examiner* — Sagar Shrestha
(74) *Attorney, Agent, or Firm* — ScienBiziP, P.C.

(57) ABSTRACT

An electronic device includes a peripheral wall defining an opening, a frame defining an internal receiving space, a tray, a stopping piece, a button, and an elastic piece. The tray receives a storage device and is slidably received in the receiving space. The stopping piece is fixed between the opening and the frame. The stopping piece blocks the tray when the tray is wholly received in the receiving space. The button is connected to the stopping piece and configured to drive the stopping piece to release the tray when the button is pressed. The elastic piece pushes the tray to pass to be partly exposed out of the opening when the stopping piece releases the tray.

14 Claims, 3 Drawing Sheets

ELECTRONIC DEVICE

CROSS-REFERENCE TO RELATED APPLICATIONS

This application claims priority to Chinese Patent Application No. 201310729986.1 filed on Dec. 26, 2013, in the China Intellectual Property Office, the contents of which are incorporated by reference herein.

FIELD

The present disclosure relates to management of storage devices.

BACKGROUND

Storage devices, such as DVDs, are employed in computers to store data. The storage device is between an elastic piece and a stopping door as a part of a sidewall of the computer. When the stopping door is opened, the storage device is pushed out of the computer under an elastic force of the elastic piece.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
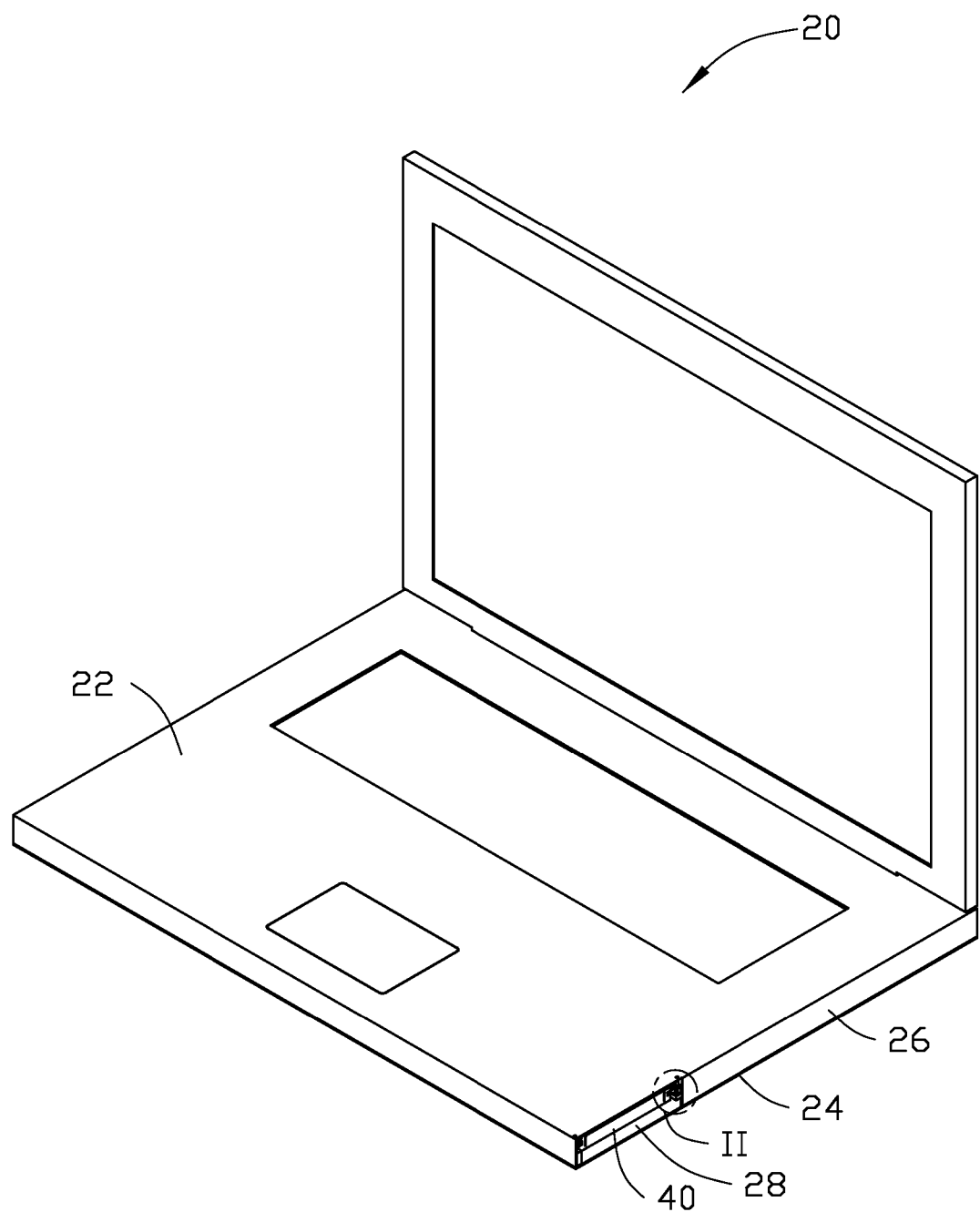
FIG. 1 is an isometric view of an embodiment of an electronic device with a hard disk pop-out apparatus therein.
Figure 2:
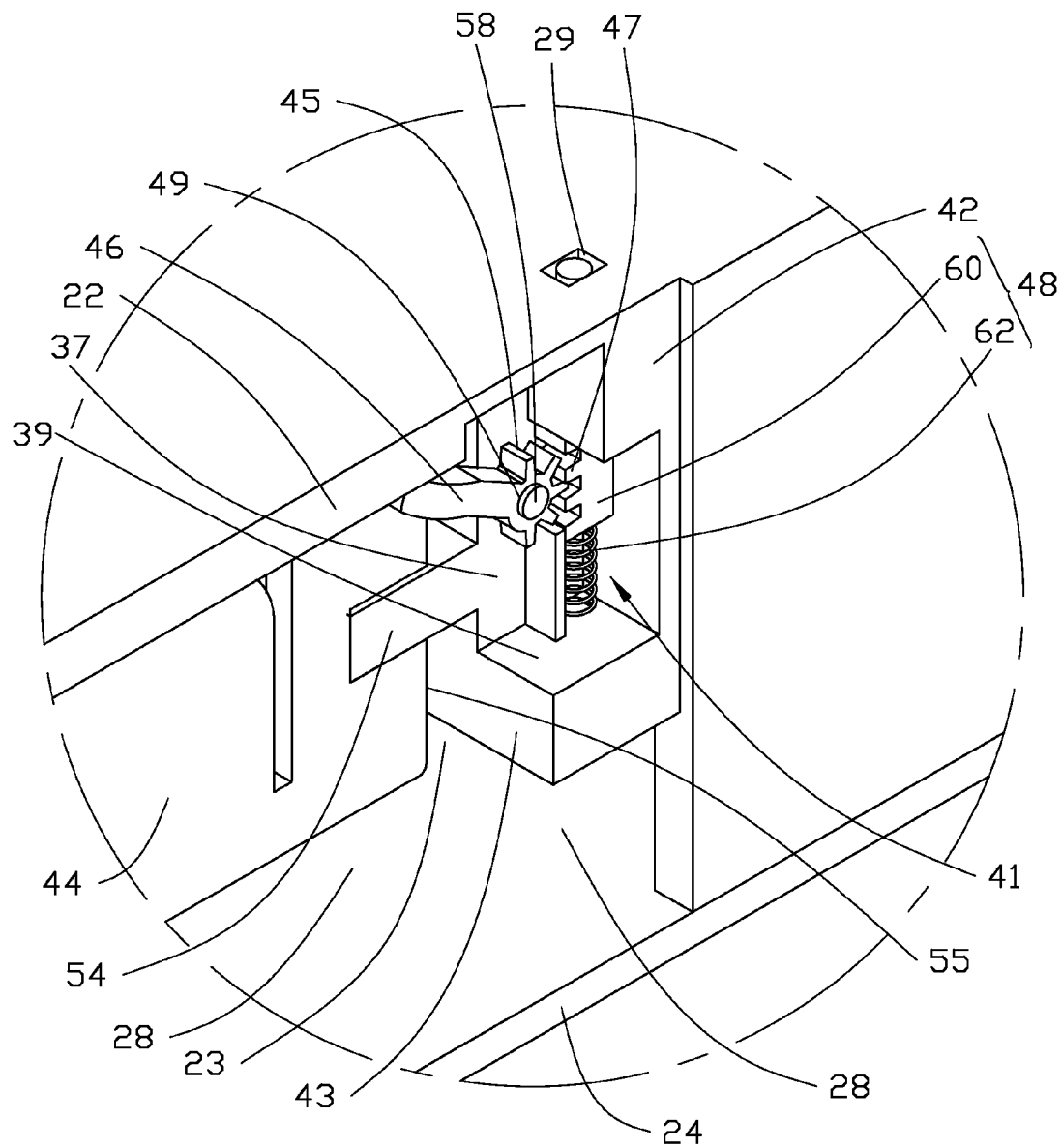
FIG. 2 is an enlarged view of the circled portion II of FIG. 1.
Figure 3:
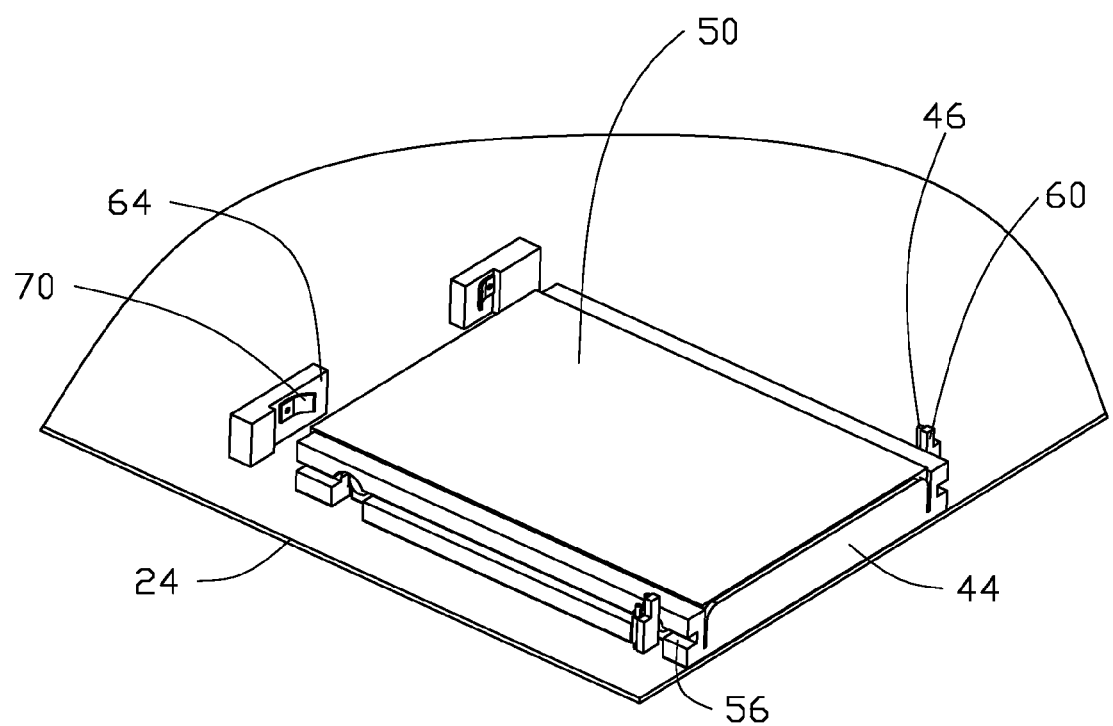
FIG. 3 is similar to FIG. 1, but showing a hard disk pushed out of the electronic device and omitting a top shell of the electronic device.

FIGS. 1-3 illustrate an electronic device 20 with a pop-out apparatus 40. The pop-out apparatus 40 is configured to push a storage device 50 out of the electronic device 20. In the embodiment, the electronic device 20 is a computer. The storage device 50 can be a CD, a DVD, or a hard disk.

The electronic device 20 includes a top shell 22, a bottom shell 24 and a periphery wall 26 fixed between the top shell 22 and the bottom shell 24. The periphery wall 26 defines an opening 28. The pop-out apparatus 40 includes a frame 42, a tray 44, a stopping piece 46, a button 48, and two first elastic pieces 70. The frame 42 is positioned between the top shell 22 and the bottom shell 24, and fixed to the top shell 22 or the bottom shell 24. In the embodiment, the frame 42 is fixed to the top shell 22. The frame 42, the top shell 22, and the bottom shell 24 cooperatively define a receiving space 23 communicating with the opening 28. The receiving space 23 is configured to receive the tray 44. The tray 44 is configured to receive the storage device 50. The tray 44 is slidably connected to the frame 42, and a part of the tray 44 can slide through the opening 28. Thus, the tray 44 can be pulled out of the electronic device 20 and the storage device 50 can be taken out of the tray 44.

In the embodiment, the frame 42 includes two opposite inner surfaces 43. A guiding strip 54 protrudes from each of the two opposite inner surfaces 43. The tray 44 includes two external surfaces 55 opposite the inner surfaces 43. Each external surface 55 defines a sliding slot 56. The guiding strips 54 are received in the sliding slots 56. The tray 44 slides along the two guiding strips 54 through the two sliding slots 56.

The stopping piece 46 is rotatably fixed to the frame 42 and positioned between the frame 42 and the opening 28. The stopping piece 46 is configured to block the tray 44 from sliding out of the receiving space 23 when the tray 44 is wholly received in the receiving space 23. The button 48 is fixed in the electronic device 20 and connected to the stopping piece 46. The button 48 is configured to drive the stopping piece 46 to release the tray 44 when the button 48 is pressed.

In the embodiment, an end of the frame 42 adjacent to the opening 28 includes a first fixed surface 37 opposite to the opening 28 and a second fixed surface 39 opposite to the top shell 22. An accepting space 41 is defined between the second fixed surface 39 and the top shell 22. The accepting space 41 communicates with the receiving space 23 and the opening 28. A shaft 58 is positioned in the accepting space 41 and fixed to the first fixed surface 37. The stopping piece 46 defines a shaft hole 49. The stopping piece 46 is sleeved on the shaft 58 through the shaft hole 49. A distal end of the stopping piece 46 passes through the accepting space 41 to block a front surface of the tray 44 opposite to the opening 28.

The top shell 22 defines a through hole 29 communicating with the accepting space 41. The button 48 includes a pressing piece 60 and a second elastic piece 62. The pressing piece 60 is received in the through hole 29. The second elastic piece 62 is positioned between the second fixed surface 39 and the pressing piece 60. The pressing piece 60 defines a rack 47. The stopping piece 46 defines a gear 45. The gear 45 engages with the rack 47. When the pressing piece 60 is pressed, the second elastic piece 62 is deformed and the pressing piece 60 slides in the through hole 29, and the rack 47 drives the gear 45 to rotate around the shaft 58. The gear 45 can rotate until the stopping piece 46 completely releases the tray 44. The second elastic piece 62 restores the pressing piece 60 when the pressure on the pressing piece 60 is removed. The second elastic piece 62 is a spring.

The two first elastic pieces 70 are fixed to the frame 42. When the tray 44 is wholly received in the receiving space 23, the first elastic piece 70 abuts against the tray 44. The two first elastic pieces 70 push the tray 44 to move toward the opening 28 until a part of tray 44 is exposed from the opening 28 when the stopping piece 46 releases the tray 44. In the embodiment, the two first elastic pieces 70 are fixed to an inner surface 64 of the frame 42 opposite to the opening 28. The first elastic piece 70 is an arc shaped clip.

The pop-out apparatus 40 blocks the tray 44 in the electronic device 20 by means of the stopping piece 46, which avoids the tray 44 directly abutting against the periphery wall 26. Any stress or force on the periphery wall 26 is thus avoided. When the button 48 is pressed, the first elastic piece 70 pushes the tray 44 out of the electronic device 20, and thereby the storage device 50 can be easily taken out of the tray 44.

It is understood that the present disclosure may be embodied in other forms without departing from the scope of those set forth herein. Thus, the present examples and embodiments are to be considered in all respects as illustrative and not restrictive, and the disclosure and the following are not to be limited to the details given herein.

What is claimed is:

1. An electronic device comprising:
a periphery wall defining an opening;
a frame defining a receiving space communicating with the opening;

a tray configured to receive a storage device and slidably received in the receiving space;

a stopping piece fixed between the opening and the frame and configured to block the tray when the tray is wholly received in the receiving space, wherein the stopping piece is rotationally fixed to the frame, and the stopping piece defines a gear and a shaft hole through which the stopping piece sleeves on a shaft fixed to the frame;

a button connected to the stopping piece and configured to drive the stopping piece to rotate to break away the tray when the button is pressed, wherein the button comprises a pressing piece, the pressing piece defines a rack engaging with the gear, and the rack drives the gear to rotate around the shaft when the button is pressed; and a first elastic piece configured to push a part of the tray to pass through the opening when the stopping piece releases the tray.

2. The electronic device as claimed in claim 1, wherein the frame comprises two opposite guiding strips, the tray defines two sliding slots, and the two guiding strips are received in the respective two sliding slots.

3. The electronic device as claimed in claim 1, wherein the button further comprises a second elastic piece configured to restore the pressing piece when the pressing piece is relaxed.

4. The electronic device as claimed in claim 1, further comprising a top shell and a bottom shell, and the periphery wall fixed between the top shell and the bottom shell.

5. The electronic device as claimed in claim 4, wherein the top shell defines a through hole, an accepting space is defined at an end of the frame adjacent to the opening, the accepting space communicates with the through hole and the receiving space, and the button passes through the through hole to be movably received in the accepting space.

6. The electronic device as claimed in claim 5, wherein the end of the frame adjacent to the opening comprises a first fixed surface opposite to the opening, the stopping piece is fixed to the first fixed surface.

7. The electronic device as claimed in claim 6, wherein the end of the frame adjacent to the opening further comprises a second fixed surface opposite to the top shell, the button is positioned on the second fixed surface.

8. The electronic device as claimed in claim 1, wherein the first elastic piece is fixed to an inner surface of the frame opposite to the opening.

9. An electronic device comprising:

a periphery wall defining an opening;

a frame opposite the opening;

a tray configured to receive a storage device and slidably fixed to the frame;

a stopping piece fixed between the opening and the frame and configured to block the tray when the tray is wholly received in the frame, wherein the stopping piece is rotationally fixed to the frame, and the stopping piece defines a gear and a shaft hole through which the stopping piece sleeves on a shaft fixed to the frame;

a button connected to the stopping piece and configured to drive the stopping piece to rotate to break away the tray when the button is pressed, wherein the button comprises a pressing piece, the pressing piece defines a rack engaging with the gear, and the rack drives the gear to rotate around the shaft when the button is pressed; and a first elastic piece configured to push the tray to slide along the frame to partly pass through the opening when the stopping piece releases the tray.

10. The electronic device as claimed in claim 9, wherein the frame comprises two opposite guiding strips, the tray defines two sliding slots, and the two guiding strips are received in the respective two sliding slots.

11. The electronic device as claimed in claim 9, wherein the button further comprises a second elastic piece, the second elastic piece is configured to restore the pressing piece when the pressing piece is relaxed.

12. An electronic device comprising:

a periphery wall defining an opening;

a frame defining a receiving space communicating with the opening;

a top shell defining a through hole, an accepting space being defined at an end of the frame adjacent to the opening, wherein the accepting space communicates with the through hole and the receiving space;

a bottom shell, wherein the periphery wall is fixed between the top shell and the bottom shell;

a tray configured to receive a storage device, the tray slidably received in the receiving space;

a stopping piece fixed between the opening and the frame, the stopping piece configured to block the tray when the tray is wholly received in the receiving space, wherein the stopping piece is rotationally fixed to the frame, and the stopping piece defines a gear and a shaft hole through which the stopping piece sleeves on a shaft fixed to the frame;

a button connected to the stopping piece and configured to drive the stopping piece to rotate to urge the tray in a direction away from receiving space when the button is pressed, wherein the button passes through the through hole to be movably received in the accepting space, and the button comprises a pressing piece, the pressing piece defines a rack engaging with the gear, and the rack drives the gear to rotate around the shaft when the button is pressed; and a first elastic piece configured to push a part of the tray through the opening when the stopping piece urges the tray.

13. The electronic device as claimed in claim 12, wherein the end of the frame adjacent to the opening comprises a first fixed surface opposite to the opening, the stopping piece is fixed to the first fixed surface.

14. The electronic device as claimed in claim 13, wherein the end of the frame adjacent to the opening further comprises a second fixed surface opposite to the top shell, the button is positioned on the second fixed surface.

* * * * *